Jan. 14, 1958 A. MASON 2,820,158
ACCELEROMETER
Filed Aug. 21, 1953
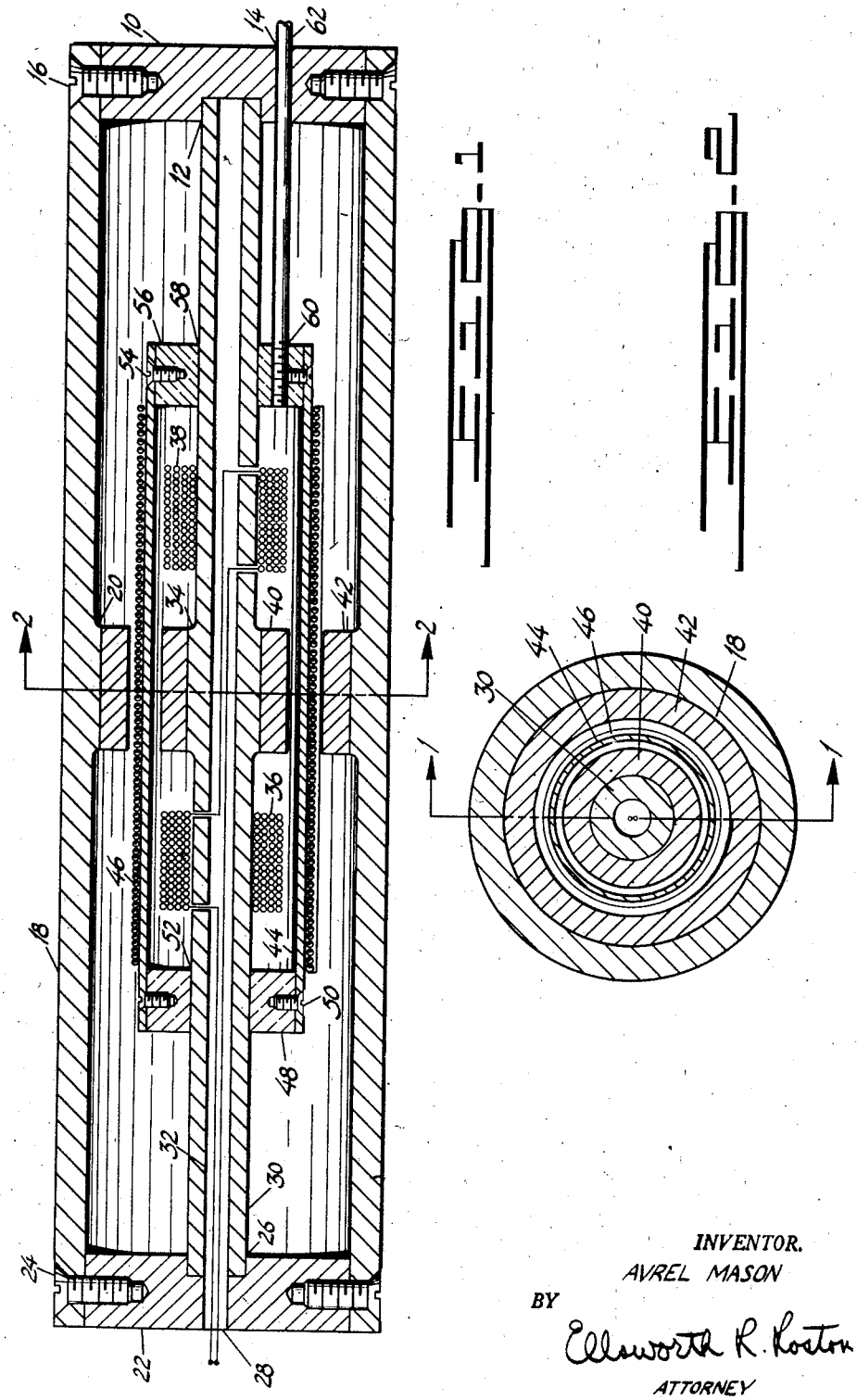
INVENTOR.
AVREL MASON
BY
Ellsworth R. Roston
ATTORNEY United States Patent Office 2,820,158
Patented Jan. 14, 1958

2,820,158
ACCELEROMETER

Avrel Mason, Birmingham, Mich., assignor to Bendix Aviation Corporation, Detroit, Mich., a corporation of Delaware Application August 21, 1953, Serial No. 375,619

13 Claims. (Cl. 310—15)

This invention relates to apparatus for measuring acceleration and more particularly to apparatus for measuring the linear acceleration of a moving object.

One type of linear accelerometer presently in use is the rotary accelerometer which employs a rack and pinion gear to translate linear motion into rotary motion. The rotating pinion gear is operative to drive an electrical device, such as a generator, to produce a signal which is indicative of the change in the rate of movement of the object driving the rack.

The rotary accelerometers now in use have several important disadvantages. Since tolerances exist in any gear meshing mechanism, the readings may not be accurate enough for certain applications. Furthermore, the dynamic vibrations which are set up by the rack and pinion gear are instrumental in reducing the accuracy of the accelerometer over a period of time and in shortening its useful life. Rotary accelerometers are further disadvantageous in that moving electrical components such as commutators, brushes and slip rings produce electrical noises during their operation and require replacement after some time because of wear.

This invention provides a simple, reliable and compact apparatus for instantaneously indicating the linear acceleration or deceleration of an object moving with a variable speed. The invention includes a plurality of coils and magnetic members which operate in conjunction with one another to produce a voltage substantially proportional to the linear acceleration of an object.

An object of this invention is to provide apparatus for operating in a reliable manner to indicate accurately the linear acceleration of an object at any instant.

Another object of this invention is to provide apparatus of the above character for giving instantaneous indications of the rate of acceleration of a member at any given position along its path of movement.

A further object is to provide apparatus of the above character for producing a magnetic flux in accordance with the linear movements of a member and for utilizing the flux to induce in a coil a voltage indicative of the linear acceleration of the member.

A still further object is to provide apparatus of the above character for insuring long life and trouble-free operation by the elimination of rotating mechanical components such as gears and also by the elimination of moving electrical components, such as commutators, brushes and slip rings.

Other objects and advantages will become apparent from a detailed description of the invention and from the appended drawings and claims.

In the drawings:

Figure 1 is a sectional view of one embodiment of the invention and is taken substantially on the line 1—1 of Figure 2; and Figure 2 is a sectional view taken substantially on line 2—2 of Figure 1.

In one embodiment of the invention, a disc 10 made from a suitable material such as Armco iron is provided with a socket 12 and an axial hole 14. The disc 10 is secured as by screws 16 to the right end of a housing 18 also made from a suitable magnetic material. A shoulder portion 20 is provided on the inner surface of the housing 18 at an intermediate position along the housing. At the left end of the housing, another disc 22 made from the same material as the disc 10 is secured as by screws 24 to the housing. The disc 22 is provided with a socket 26 and a centrally disposed hole 28.

A shaft 30 also made from a magnetic material is axially disposed within the housing 18. The opposite ends of the shaft 30 are retained within the sockets 12 and 26 provided in the discs 10 and 22, respectively. The shaft 30 is provided with a centrally disposed hole 32 and a collar 34 which faces the shoulder portion 20 provided on the housing 18.

A plurality of turns of wire are wound on the shaft 30 to form a coil 36 adjacent to the left end of the collar 34. In like manner, a plurality of turns of wire are wound on the shaft 30 to form a coil 38 adjacent to the right end of the coil 38. The right ends of the coils 36 and 38 are connected together to provide a cumulative combination of the voltages from the two coils. The left ends of the coils 36 and 38 are extended through the hole 32 in the shaft 30 and the hole 28 in the disc 22 to provide connections to other components in a measuring circuit (not shown).

Annular pole pieces 40 and 42 are retained on the collar 34 and the shoulder portion 20, respectively and are radially separated from each other by a relatively short air gap. The pole pieces 40 and 42 are made from a suitable material to provide a permanent magnetization. The pole pieces are magnetized to provide a substantially uniform magnetic flux extending in a radial direction through the air gap between the pole pieces. Since the housing 18, the discs 10 and 22, and the shaft 30 are made of a magnetic material, two complete and substantially equal paths are provided in parallel with each other for the passage of the magnetic flux.

A tube 44 made of a suitable non-magnetic material such as brass is positioned within the housing 18 between the pole pieces 40 and 42. A plurality of turns of wire are wound on the tube 44 to form a coil 46. The ends of the coil 46 are connected as by solder to short circuit the coil. At the left end of the tube 44, an annular bearing 48 made of a suitable non-magnetic material such as oilite bronze is secured as by screws 50 to the tube. The bearing 48 is provided with a centrally disposed hole 52 to slidably receive the shaft 30.

The right end of the tube 44 is secured as by screws 54 to an annular bearing 56 made of the same non-magnetic material as the bearing 48. The bearing 56 is provided with a centrally disposed hole 58 to slidably receive the outer surface of the shaft 30. A threaded axial hole 60 is provided in the bearing 56 in alignment with the axial hole 14 in the disc 10. A threaded rod 62 is screwed into the hole 60. The right end of the rod 62 extends through the hole 14 in the disc 10.

As previously disclosed, the flux provided by the pole pieces 40 and 42 follows two complete paths. Referring to the upper half of Figure 1, it will be apparent that one-half of the flux passes through a first path including the pole pieces 40 and 42, the housing 18, the disc 22 and the shaft 30. The other half of the flux passes through a second path which includes the pole pieces 40 and 42, the housing 18, the disc 10 and the shaft 30. The flux in the first path extends through the disc 22 in a counter-clockwise direction and the flux in the second path extends through the disc 10 in a clockwise direction. Since the flux in each path passes through the pole pieces 40 and 42 in the same direction, the flux in the air gap between the pole pieces is equal to the sum of the flux passing through the first and second paths.

Upon application of a force to the right end of the rod 62, the bearings 48 and 56, the tube 44 and the coil 46 move as a unit within the housing 18 and in an axial direction relative to the housing 18, the shaft 30 and the pole pieces 40 and 42. As a result, the magnetic flux extending radially through the air gap between the pole pieces 40 and 42 cuts across the turns of the coil 46 to induce a voltage in the coil.

Since the coil 46 is short circuited, the voltage induced in the coil 46 causes a relatively large current to flow through the coil. This current has an amplitude substantially proportional to the rate at which the coil 46 moves relative to the pole pieces 40 and 42. The current flowing through the coil 46 in turn produces a magnetic flux having a strength which varies in accordance with the amplitude of the current.

The flux produced by the coil 46 passes through a low reluctance path which includes the housing 18, the disc 22, the shaft 30 and the disc 10. If the coil 46 moves to the left relative to the pole pieces 40 and 42, the flux produced will extend through the low reluctance path in a counter-clockwise direction. This flux supplements the flux already disposed in the first path to increase the flux passing through the left side of the shaft 30. However, the flux produced by the coil 46 opposes the flux disposed in the second path to decrease the flux passing through the right side of the shaft 30. The flux passing through the air gap, however, will remain the same since the increase of flux in the first path compensates for the decrease of flux in the second path.

When the coil 46 moves to the left at a constant rate, the flux produced by the coil 46 remains constant. This causes the flux extending through each side of the shaft 30 to be changed by a constant amount from its normal value. Since the flux on each side of the shaft 30 has a constant value dependent upon the steady rate of movement of the coil 46, the number of flux lines linking the coils 36 and 38 remains substantially constant. As a result, no voltages are induced in the coils. In this way, the apparatus constituting this invention indicates a zero acceleration for the coil 46.

If, however, the coil 46 moves to the left at a variable rate, the voltage induced in the coil and the current flowing through the coil will vary in accordance with the rate of movement of the coil. This causes the coil 46 to produce a flux which also varies in accordance with the rate of movement of the coil. Such a variation of flux produces a similar variation of flux passing through each side of the shaft 30. When this occurs, the number of flux lines linking the coils 36 and 38 varies in a similar pattern to induce equal voltages in the coils.

Since the variation in flux lines linking the coil 36 is opposite to the variation in flux lines linking the coil 38, opposite voltages are induced in the coils when the coil 36 moves at a variable rate. Because of the connections between the coils 36 and 38, the voltages induced in the coils are cumulative and the voltage on the output terminals of the coils is equal to substantially twice the voltage induced in each of the coils 36 or 38.

The amplitude of the output voltage from the coils 36 and 38 is a measure of the change in the rate of movement of the coil 46. In other words, the output voltage is a measure of the acceleration or deceleration of the coil 46. Similarly, an output voltage is produced by the coils 36 and 38 when the coil 46 is moved to the right. This output voltage has an amplitude substantially proportional to the acceleration of the coil 46 but the polarity of the voltage is opposite to that disclosed above.

In this way, the linear acceleration or deceleration of a moving object can be measured by coupling the object to the right end of the rod 60 while the housing 18 is supported in a stationary position. The instantaneous voltage produced in the coils 36 and 38 at any given position of the moving object can be measured on an oscilloscope calibrated to give acceleration or deceleration readings. If an average reading is desired, a calibrated voltmeter will provide such a reading.

The relationship between the axial movement of the coil 46 and the voltages induced in the coils 36 and 38 can be expressed mathematically. Since the voltage induced in the coil 46 is substantially proportional to the axial velocity of the coil, $$E_1 = K\frac{dx}{dt} \quad (1)$$

where $E_1$ = the voltage induced in the coil 46

$\frac{dx}{dt}$ = the rate at which the coil 46 moves axially, and $K$ = a constant As previously disclosed, the current flowing through the coil 46 and the flux produced by the current are proportional to the voltage induced in the coil. As a result, the following relationship is obtained:

$$\phi_1 = K_1 \frac{dx}{dt} \quad (2)$$

where $\phi_1$ = the flux produced by the coil 46, and $K_1$ = a constant

When Equation 2 is differentiated, a relationship is obtained that $$\frac{d\phi_1}{dt} = K_1 \frac{d^2x}{dt^2} \quad (3)$$

Since the voltage induced in each of the coils 36 and 38 is proportional to the change in the flux linking the coils, $$E_2 = K_2 \frac{d\phi}{dt} \quad (4)$$

where $E_2$ = the voltage induced in each of the coils 36 and 38

$\frac{d\phi}{dt}$ = the rate at which a change is produced in the magnetic flux threading each of the coils 36 and 38, and $K_2$ = a constant As previously disclosed, the changes in the flux threading the coils 36 and 38 result from the flux produced by the coil 46. This causes $$E_2 = K_2 \frac{d\phi_1}{dt} \quad (5)$$

Substituting Equation 3 in Equation 5, $$E_2 = K_1 K_2 \frac{d^2x}{dt^2} = K_3 \frac{d^2x}{dt^2} \quad (6)$$

where $K_3$ = a constant

The apparatus disclosed above has several important advantages. It provides an instantaneous and accurate indication of the linear acceleration of a moving object over a wide range of measurement. The apparatus also provides a sensitive response to the acceleration or deceleration of the object because the coil 46, which is short circuited, produces relatively large changes of flux in the shaft 30 for small changes in the linear velocity of the coil. The apparatus also provides an accurate and sensitive response because of its operation in maintaining a substantially constant flux through the pole pieces 40 and 42 regardless of the acceleration or deceleration of the coil 46 and the amplitude of such acceleration or deceleration.

Since the voltages induced in the coils 36 and 38 are always cumulative, there is no need for providing a commutator to switch opposing voltages as is normally required in D.-C. devices, such as a D.-C. generator. The elimination of a commutator is instrumental in producing a long life and trouble-free operation for the apparatus since a commutator includes moving electrical components which wear out periodically and produce electrical noises during their operation. Furthermore, rotating mechanical components such as gears, which set up dynamic vibrations and affect the accuracy and life of rotary accelerometers, are eliminated. Another feature of the apparatus is that it does not require external excitation as is necessary for certain type accelerometers.

The apparatus is simple and compact in its construction and is reliable in its operation. In addition to its use as an accelerometer, various other uses will become apparent to persons skilled in the art. For example, the voltage output as determined by the movements of an object can be utilized as an error voltage to correct any deviations in the movements of the object.

Although this invention has been disclosed and illustrated with reference to particular applications, the principles involved are susceptible of numerous other applications which will be apparent to persons skilled in the art. The invention is, therefore, to be limited only by the scope of the appended claims.

What is claimed is:

1. In combination, an outer member having magnetic properties, an inner member having magnetic properties, means for providing a substantially constant magnetic field between the inner and outer members, a closed electrical circuit including a first coil positioned between the inner and outer members and movable relative to the members to produce a current flow in the coil and a corresponding magnetic flux through the inner member, and a second coil fixedly positioned on the inner member to produce a signal indicative of the change in the rate of movement of the first coil relative to the inner and outer members.

2. In combination, an outer member having magnetic properties, an inner member having magnetic properties and movable with the outer member, means for providing a substantially constant magnetic field between the inner and outer members, a closed electrical circuit including a first coil positioned between the inner and outer members, and a second coil fixedly positioned on the inner member and adapted to produce a signal in accordance with the change in the rate of movement of the inner and outer members relative to the first coil.

3. In combination, an outer member having magnetic properties, an inner member having magnetic properties and attached to the outer member, means for providing a substantially constant magnetic field between the inner and outer members, a closed electrical circuit including a first coil positioned between the inner and outer members and movable relative to the members to produce a current flow in the coil and a corresponding flux through the inner member, and a second coil wound on the inner member to produce a voltage having an amplitude which is substantially proportional to the change in the rate of movement of the first coil relative to the inner and outer members.

4. In combination, an outer member having magnetic properties, an inner member having magnetic properties, means for providing a substantially constant flux between the inner and outer members, a closed electrical circuit including a first coil positioned between the inner and outer members and adapted to move in an axial direction relative to the members for producing a variable current flow in the first coil and a corresponding flux through the inner member, and a second coil wound on the inner member to produce a voltage having an amplitude indicative of the rate of change of the current flow in the first coil.

5. In combination, an inner member having magnetic properties, an outer member having magnetic properties, means for providing a substantially constant magnetic field between the inner and outer members, a closed electrical circuit including a coil positioned between the inner and outer members and movable relative to the members to produce in the coil a current flow which is variable in accordance with the rate of movement of the coil relative to the inner and outer members, and means disposed between the inner member and the coil for producing a signal indicative of the rate of variations in the current flow through the coil.

6. In combination, a sleeve having magnetic properties, a shaft having magnetic properties and attached to the sleeve, means for providing a substantially constant magnetic flux between the sleeve and the shaft, a support member positioned between the sleeve and the shaft and movable relative to the sleeve and the shaft, a short-circuited first coil wound on the support member, and a second coil wound on the shaft to produce a voltage having an amplitude dependent upon the change in the rate of movement of the support member relative to the shaft and the sleeve.

7. In combination, a shaft having magnetic properties, a sleeve having magnetic properties and surrounding the shaft, means for providing a substantially constant magnetic flux between and substantially perpendicular to the shaft and the sleeve, a closed electrical circuit including a first coil positioned between the shaft and the sleeve and adapted to move in a direction substantially perpendicular to the magnetic flux to produce a current flow in the coil and a corresponding flux through the shaft, and a second coil wound on the shaft and adapted to produce a voltage having an amplitude substantially proportional to the change in the rate of movement of the first coil relative to the magnetic flux.

8. In combination, a sleeve having magnetic properties, a shaft having magnetic properties and attached to the sleeve, means for providing a substantially constant magnetic flux between the shaft and the sleeve, the magnetic flux being disposed in a direction to radially intersect the shaft and the sleeve in a substantially perpendicular direction, a hollow support member positioned between the shaft and the sleeve and adapted to move in an axial direction relative to the shaft and the sleeve, a short-circuited first coil movable with the hollow support member to traverse the magnetic flux for producing in the coil a current variable in accordance with the rate of movement of the hollow support member and a corresponding variable flux through the shaft, and a second coil wound on the shaft for producing a voltage having an amplitude indicative of the variations in the current flow through the first coil.

9. In combination for measurement of linear acceleration, a shaft having magnetic properties, a sleeve having magnetic properties and surrounding the shaft, a tube positioned between the shaft and the sleeve and movable relative to the shaft and the sleeve, means for providing a substantially constant magnetic flux between the shaft and the sleeve in a direction substantially perpendicular to the axis of the tube, a closed electrical circuit including a first coil wound on the tube for producing a current flow in the coil and a corresponding flux through the shaft upon a movement of the tube relative to the shaft and the sleeve, and a second coil wound on the shaft for producing a voltage substantially proportional to the change in the rate of movement of the tube relative to the shaft and the sleeve.

10. In combination, an outer member having magnetic properties, an inner member having magnetic properties, means for providing a substantially constant flux in an air gap between the inner and outer members, a first coil positioned between the inner and outer members and movable at a variable rate relative to the inner and outer members to traverse the flux, the first coil being short circuited for the production of a variable current flow in the coil upon relative movements between the coil and the inner and outer members to produce a variable flux in a magnetic circuit including the inner member but not the air gap between the inner and outer members, and a second coil wound on the inner member for producing a voltage having an amplitude substantially proportional to the rate of flux variations through the inner member.

11. In combination, a shaft having magnetic properties, a sleeve having magnetic properties and surrounding the shaft, a tube positioned between the shaft and the sleeve and movable in an axial direction relative to the shaft and the sleeve, means for providing a substantially constant flux between the shaft and the sleeve in a direction substantially perpendicular to the axis of the tube, a first coil wound on the tube for the production of a variable current flow through the coil upon relative movements between the tube and the inner and outer members, the first coil being substantially short circuited, the current flow in the first coil being operative to provide flux variations in the shaft, and a second coil wound on the shaft for producing a voltage substantially proportional to the flux variations in the shaft.

12. In combination, an outer member having magnetic properties, an inner member having magnetic properties and connected to the outer member to provide a magnetic flux path through the members, means for providing a substantially constant magnetic flux through the inner and outer members and for providing the substantially constant flux between the members, a closed electrical circuit including a first coil positioned between the inner and outer members and movable relative to the members to traverse the flux and to produce in the coil a current flow having an amplitude dependent upon the rate of movement of the coil relative to the members, the current flow in the first coil being operative to provide a magnetic flux for producing a corresponding variation in the flux through the inner member, and a second coil wound on the inner member for producing a voltage having an amplitude dependent upon the rate of flux variations through the inner member.

13. In combination, a sleeve having magnetic properties, a shaft having magnetic properties positioned within the sleeve and attached to the sleeve, a first pole piece on the sleeve, a second pole piece on the shaft positioned opposite the first pole piece to provide a substantially constant magnetic flux between the pole pieces and a passage of the flux through the inner and outer members, a closed electrical circuit including a first coil positioned between the first and second pole pieces and movable relative to the pole pieces to traverse the flux and to produce in the coil a current flow having an amplitude substantially proportional to the rate of movement of the coil relative to the pole pieces, the current flow in the first coil providing a magnetic flux for passage through the shaft and the sleeve for producing a variation in the flux in the shaft and sleeve corresponding to the variations in the current through the coil, and a second coil positioned on the shaft for producing a voltage having an amplitude substantially proportional to the rate of flux variation in the shaft.

References Cited in the file of this patent

UNITED STATES PATENTS

| 339,839 | Batchelor | Apr. 13, 1886 |
| 2,598,668 | Barry | June 3, 1952 |
| 2,621,224 | Priest | Dec. 9, 1952 |

FOREIGN PATENTS

| 733,043 | France | June 28, 1932 |